United States Patent
Bianchi et al.

(10) Patent No.: US 10,735,493 B2
(45) Date of Patent: Aug. 4, 2020

(54) SYSTEM, METHOD AND PROGRAM PRODUCT FOR MANAGING MOBILE DEVICE OPERATION

(71) Applicant: International Business Machines Corporation, Armonk, NY (US)

(72) Inventors: Silvia C. S. Bianchi, Sao Paulo (BR); Tiago D. Generoso, Pocos de Caldas (BR); Marcos V. L. Paraiso, Sao Paulo (BR); Sergio Varga, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 14/949,858

(22) Filed: Nov. 23, 2015

(65) Prior Publication Data

US 2017/0147603 A1 May 25, 2017

(51) Int. Cl.
*H04L 29/08* (2006.01)
*H04W 8/20* (2009.01)
*G06F 16/172* (2019.01)

(52) U.S. Cl.
CPC ............ *H04L 67/06* (2013.01); *G06F 16/172* (2019.01); *H04W 8/20* (2013.01)

(58) Field of Classification Search
CPC .. G06F 17/30067; G06F 3/0605; G06F 3/067; G06F 3/0631; G06F 3/0647; G06F 16/172; H04L 67/06; H04W 8/20
USPC ....................................................... 707/827
See application file for complete search history.

(56) References Cited

U.S. PATENT DOCUMENTS

| | | | |
|---|---|---|---|
| 7,496,604 B2 | 9/2009 | Sutton, Jr. et al. | |
| 8,903,838 B2 | 12/2014 | Hunter et al. | |
| 2006/0041527 A1* | 2/2006 | Fessler | G06F 16/164 |
| 2006/0106793 A1* | 5/2006 | Liang | G06F 16/3338 |
| 2007/0050423 A1 | 3/2007 | Whalen et al. | |
| 2009/0106200 A1* | 4/2009 | Salinas | G06F 16/70 |
| 2010/0161562 A1 | 6/2010 | Karajagi | |
| 2013/0117349 A1* | 5/2013 | Burnette | G06Q 30/0201 709/202 |
| 2014/0095457 A1* | 4/2014 | Quan | G06F 17/30085 707/697 |
| 2014/0143647 A1 | 5/2014 | Reshadi et al. | |
| 2014/0310386 A1* | 10/2014 | Srinivasan | H04L 65/605 709/219 |
| 2015/0046408 A1 | 2/2015 | Rinne | |
| 2015/0249694 A1* | 9/2015 | Kinkade | G06F 16/178 709/204 |

* cited by examiner

*Primary Examiner* — Michael Pham
(74) *Attorney, Agent, or Firm* — Law Office of Charles W. Peterson, Jr.; Louis J. Percello, Esq.; Joseph Petrokaitis, Esq.

(57) ABSTRACT

A mobile device file management system, method of managing mobile device file sharing and a computer program product therefor. A media repository server stores files and metadata for each stored file. Mobile devices couple to the media repository server over a network. At least one mobile device screens metadata for requested files provided from the media repository server. The device checks local storage for any screened filed identified as popular, and if already present fulfills the request with that copy Otherwise, the device downloads a copy from the media repository server.

23 Claims, 3 Drawing Sheets

SYSTEM, METHOD AND PROGRAM PRODUCT FOR MANAGING MOBILE DEVICE OPERATION

BACKGROUND OF THE INVENTION

Field of the Invention

The present invention is related to managing mobile device operation, and more particularly, to managing storing multimedia files on mobile devices.

Background Description

Social media has become ubiquitous. Typical such social media sites include, for example, Facebook, Myspace, Google+, Twitter, YouTube, and Instagram. Typical social media sites allow users to connect with other users and share thoughts, comments and other material, including media (audio, videos and still images) or multimedia files. The typical social media user has a presence on multiple social media sites with multiple points of access, e.g., from a desktop computer, a laptop, and mobile devices such as a tablet and a smart phone. Currently there are more mobile devices than people in the world with hundreds of millions or billions of people using mobile devices to share multimedia files. Thus, social media maintain a presence on mobile devices using platform specific social applications for multimedia including, for example, Whatsapp, Facebook Messenger, Line, and Viber.

Frequently, when a user shares to one social media site, the user replicates the same post to one or more other sites. For example, someone may upload the same video to Facebook, Myspace and Google+, and then forward a copy by email and in a multimedia message (MMS). Typical file operations involved in handling these files, include file creation/deletion, copying, editing, transmitting (e.g., as an email attachment), and downloading from an external site. Also typical mobile device apps for social media tend to display multimedia files when the app is open, regardless of whether a particular file is selected for display. This high multimedia file usage has driven a high download and upload volume, frequently leading to downloading and uploading duplicate files.

Replicating these multimedia files, which may be relatively large, creates local duplicates that quickly fill precious mobile device storage. Moreover, uploading or downloading one of these large duplicates, uses network bandwidth, and for a mobile device wears on the device battery. Additionally, many cellular plans include a cap on monthly data usage, that uploading and downloading a duplicate of a large file consumes, reducing the remaining available data usage for the month.

Thus, there is a need for detecting and managing file duplication in large or distributed file systems; and, more particularly for effectively managing duplicated use of identical files to save mobile device storage, and optimize network bandwidth usage without degrading mobile device performance.

SUMMARY OF THE INVENTION

A feature of the invention is bandwidth expended downloading files is minimized;

Another feature of the invention is download data is minimized;

Yet another feature of the invention is multiple copies of popular files are minimized for mobile device storage.

The present invention relates to a mobile device file management system, method of managing mobile device file sharing and a computer program product therefor. A media repository server stores files and metadata for each stored file. Mobile devices couple to the media repository server over a network. At least one mobile device screens metadata for requested files provided from the media repository server. The device checks local storage for any screened filed identified as popular, and if already present fulfills the request with that copy Otherwise, the device downloads a copy from the media repository server.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
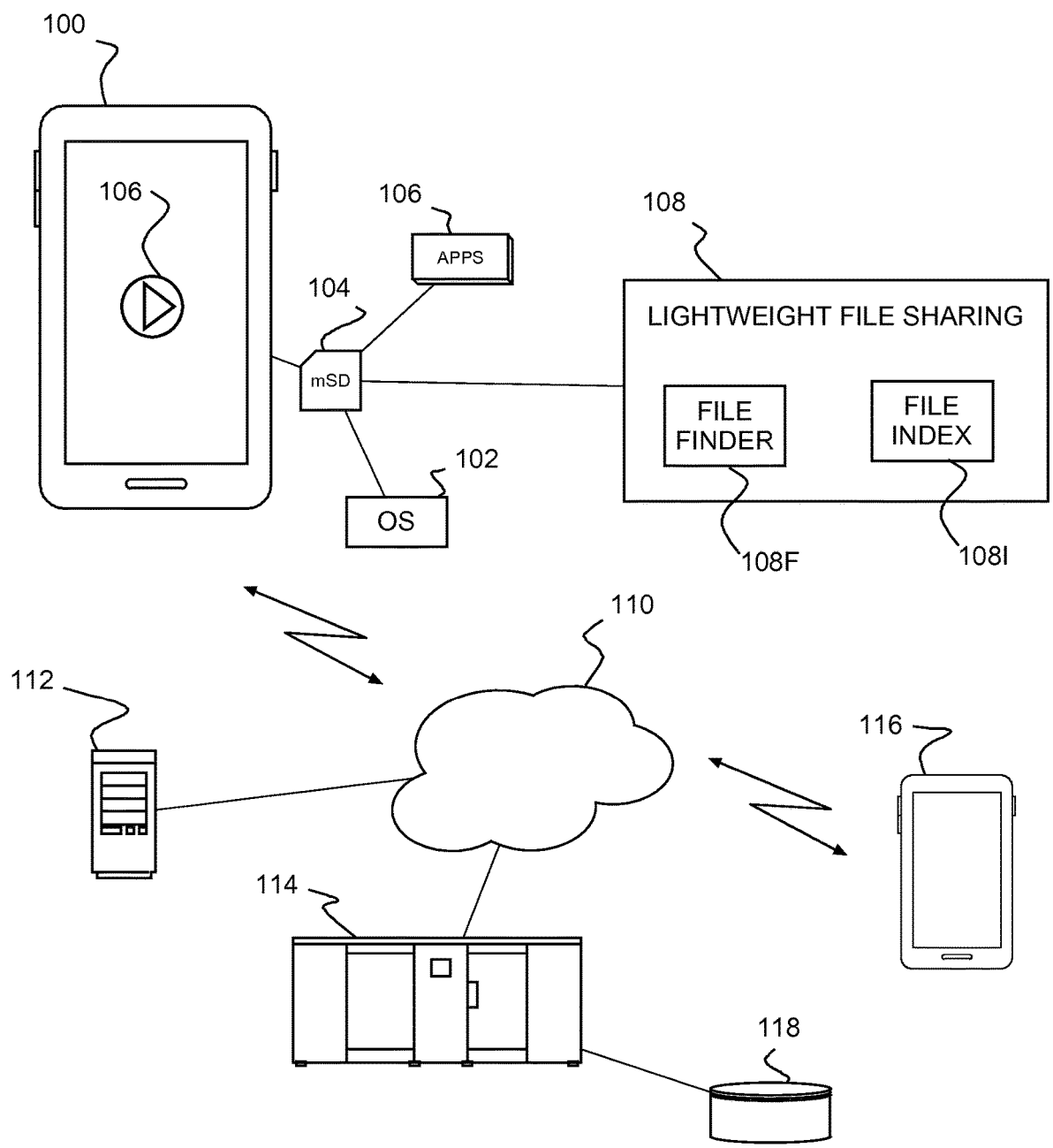
FIG. 1 shows an example of a mobile device managing inter-platform file sharing, according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning now to the drawings and more particularly, FIG. 1 shows an example of a preferred mobile device 100 managing inter-platform file sharing. Most software, when it creates a file, embeds metadata into the new file. Frequently software will add metadata into files it handles. The metadata provides information about one or more aspects of the file, including, for example, a file ID, file popularity, content information, a file owner, a creation time and a creation location. Preferred mobile devices 100 are metadata aware, selectively downloading files where metadata indicates the files are not already present in the device.

The preferred mobile device 100 may be running a suitable mobile operating system (OS) 102 and includes local storage 104 with multiple installed applications (apps) 106 with one or more apps active and displaying multimedia files. In this example one installed app 108 is metadata aware and manages inter-platform, lightweight file sharing. The preferred mobile device 100 connects over a network 110 to service provider servers, e.g., one or more media repository servers 112, 114, and to other mobile devices 116.

The OS 102 may be any suitable mobile operating system such as, for example, iOS from Apple, Android, or Win RT, modified for inter-platform file sharing, according to a preferred embodiment of the present invention. The mobile device 100 storage 104 may be built-in and/or add-on storage, such as in flash memory storage cards, e.g., a µSD card. Preferably, the installed apps 106, 108 are maintained in storage 104 with one or more apps 106 active and displaying multimedia files, e.g., a social media app or a texting app. The network 110 may be, for example, a cellular network, the Internet, an intranet or a combination thereof, coupling the service provider servers 112, 114 and mobile devices 100, 116 to each other.

The preferred lightweight file sharing feature or app 108 includes a file finder 108F and a file index 108I. The file finder 108F verifies file popularity for requested files and communicates with the OS 102 and the server(s) 112, 114. The file index 108I includes file metadata that includes at least a file ID and popularity measure for each file downloaded to the mobile device 100. Although shown in this example as an app 108, lightweight file sharing may be resident as a feature in a version of the OS. Also, the lightweight file sharing app 108 may be provided as an add-on app, downloadable from an app store or a service provider server, e.g., 114, installed and resident on the mobile device 100.

Once resident on a preferred device 100, either included with the OS 102 or installed as an active app interfacing with the OS 102, lightweight file sharing 108 minimizes file duplication in device storage 104, especially for popular files. Whenever there is a request for a popular (frequently requested) file, lightweight file sharing 108 causes the OS 102 to check whether that file is already available in storage 104. If available, the OS 102 provides the requesting app with a pointer to storage 104 for the local file for display by the requesting app 106. Thus, with the lightweight file sharing app 108 installed, the preferred device 100 just reuses a previously downloaded copy. In particular, lightweight file sharing minimizes bandwidth consumption, to avoid using large chunks of monthly contract data by downloading and re-downloading large files, and especially large popular files, again and again.

Figure 2:
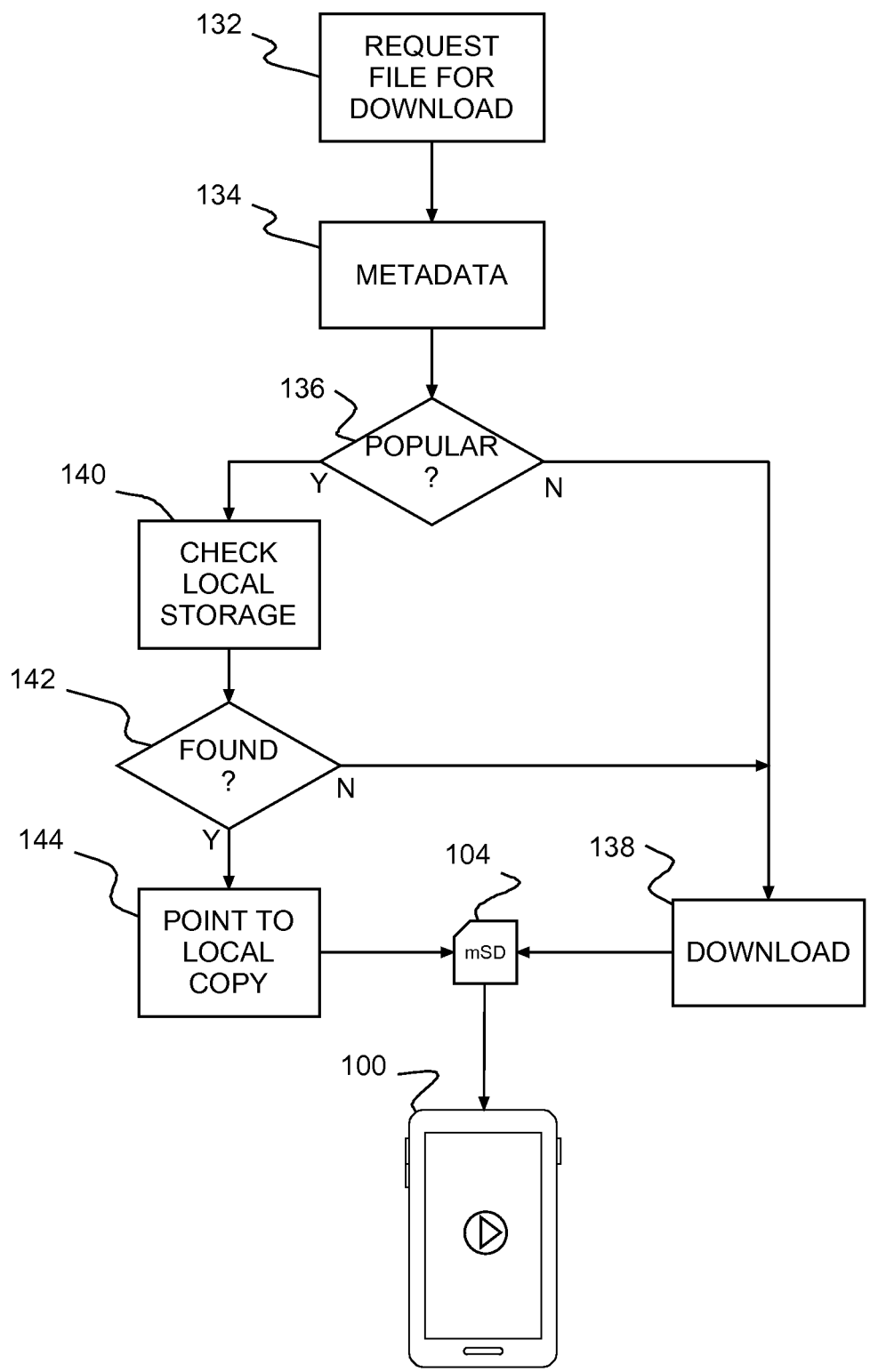
FIG. 2 shows lightweight file sharing in a preferred device.

FIG. 2 shows an example of lightweight file sharing 130 in a preferred device, e.g., by app 108 of FIG. 1. Whenever an active app 106 requests a file 132, the OS 102 forwards the request to a service provider media repository server 112, 114. The media repository server 112, 114 returns metadata 134 that includes, for example, a file identification (ID) and a popularity indication or measure. The app 108 ignores relatively unpopular 136 files, which are downloaded 138 normally for the requesting app 106 and displayed 100. However, for more popular files, the app 108 causes the OS 108 to check 140 local storage 104, and downloads 138 the file only if the file is not already found 142 in storage 104. Once downloaded, the OS 108 stores the file in local storage 104 and displays 100 it. However, for any requested file found 142 in local storage 104, the app 106 points 144 to the previously downloaded file in local storage 104, and displays 100 it.

Figure 3:
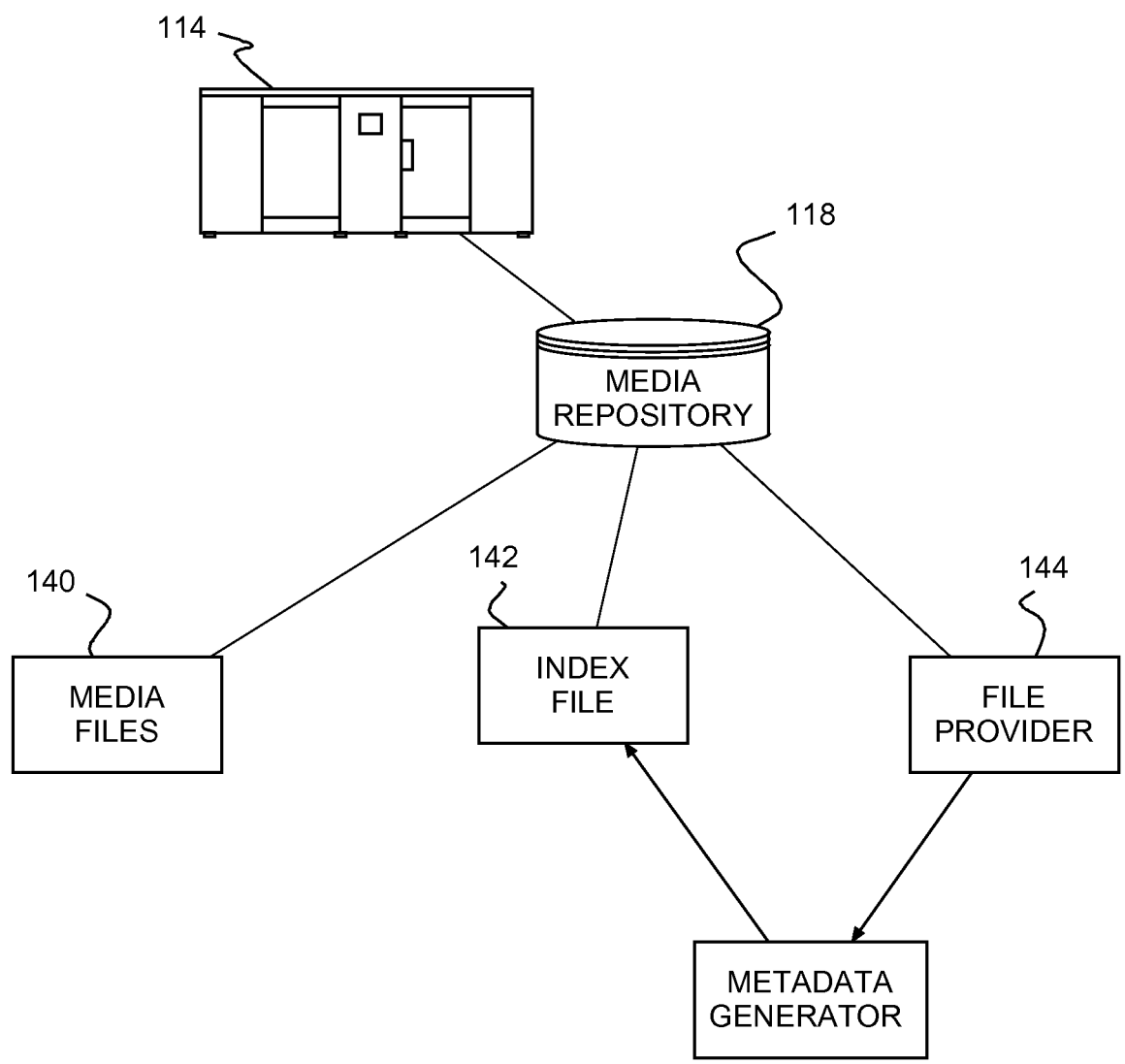
FIG. 3 shows an example of a media repository server.

FIG. 3 shows an example of a media repository server 114 of FIG. 1 with like features indicated identically. The media repository server 114 stores and forwards files to the users, and may be included on the server 114 as a service provider component such as chat, social media or social network. A media repository on storage 118 stores previously requested files 140. An index file 142, also on storage 118 in this example, stores metadata associated to the media files in media repository 118. A file provider 144 handles files for mobile devices 100, 106, and in this example counts file usage for updating the popularity measure. The file provider 144, also on storage 118 in this example, sends metadata from media repository 118 in response to original requests, and selectively follows with the identified files from media repository 118 when requested. A metadata generator 146 generates file IDs and generates and updates popularity measures.

So, for example, an incoming text or email to a mobile device 100 user includes an embedded file 132. Instead of including the full file, which may be hundreds of megabytes (or larger) in size, the media repository server 112, 114 may send metadata 134 for the file with the text. The metadata 134 identifies the file and indicates popularity. Popularity may be indicated, for example, by a weighted moving average of accesses or downloads with popular files having a popularity measure above a predefined popularity threshold.

For example, the metadata generator 146 may weight popularity measure for currency over a given time period, combining the previous or stale value (the value being updated) and a current value over the currently ending time period, e.g., over an hour, a half day, a day or a week. The averaged periodic value may be a count from incrementing a counter with each increment representing a selected number (n) of requests for views/downloads/forwards. The initial popularity threshold may be specified by default, by the mobile device user, or by a sysadmin and subsequently adjusted.

The metadata generator 146 may generate file IDs, for example, using a hashing function. Secure Hash Algorithm 1 (SHA-1) is an example a suitable hashing function. IDs may be derived applying SHA-1 to the file name in combination with, for example, the owner and creation time and location.

Preferably, the OS 102 checks 136 the file popularity in the incoming metadata 134 as a measure of the likelihood that the file is local in storage 104. Any file with a low popularity measure, below the threshold value, is unlikely to be stored locally. Thus, preferably, the OS 102 foregoes checking any relatively unpopular file (unlikely to be stored locally), and downloads 138 and displays 100 the file.

For any popular file 136 the app 108 first causes the OS 102 to check 140 local file metadata to determine whether the file is already local, i.e., previously downloaded. The OS 102 checks 140 the file ID against the IDs for all files stored on the device 100. If the file is local, then the OS 102 responds 144 with a message to the requesting app 106 with the link to the local file and the requesting app 106 displays the file. Otherwise, the OS 102 returns a message to the app 108 that the file is not in device storage 104, and requests a download from the server.

Advantageously, file sharing according to a preferred embodiment of the present invention reduces average download times for accessing popular files, where the download time for popular files already in the mobile device is essentially eliminated. For available popular files a pointer to a local copy instantly provides access, avoiding downloading it again. Especially for service contracts with plans that have monthly data cap, avoiding downloading multiple copies of the same popular file significantly reduces consumption. Also, for mobile devices with a limited, fixed amount of available local storage, reducing/eliminating popular file duplication in storage, effectively extends mobile device storage, with local files better organized, for greatly enhanced mobile device user experience.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A mobile device file management system comprising:
a media repository server storing one or more files previously downloaded from one of a plurality of platforms, and metadata for each stored file;
a non-transitory computer-readable medium;
a network; and
one or more mobile devices coupled to said media repository server over said network, at least one mobile device of said one or more mobile devices
selectively providing said media repository server with a request for a file from a platform stored on said media repository server,
receiving from said media repository server metadata for the requested said file,
screening metadata for said requested file to identify whether it is a popular file already present from any of said plurality of platforms in said at least one mobile device, and whenever said requested file is a popular file not already present
downloading said requested file from said media repository server, wherein popular files already present are not re-downloaded such that mobile device data consumption is reduced.

2. The mobile device file management system as in claim 1, wherein said media repository server comprises: a media repository storing previously requested files; an index file storing metadata information associated to the media files in media repository; and a file provider handling files for said one or more mobile devices, said file provider sending metadata from media repository in response to original download requests from said at least one mobile device, and following with files from said media repository identified for downloading by said at least one mobile device.

3. The mobile device file management system as in claim 1, wherein said network is a cellular network.

4. The mobile device file management system as in claim 1, wherein said at least one mobile device downloads any file from said media repository server not found popular without checking for the file on said at least one mobile device.

5. The mobile device file management system as in claim 1, wherein said metadata includes an identification (ID) and popularity measure for each stored file.

6. The mobile device file management system as in claim 5, wherein each said at least one mobile device compares the metadata popularity measure against a popularity threshold, files with said metadata popularity measure above said popularity threshold being identified as popular.

7. The mobile device file management system as in claim 5, wherein said media repository server maintains a moving average of accesses to each file, said popularity measure being said moving average.

8. The mobile device file management system as in claim 1, wherein for popular files found on a respective mobile device, said respective mobile device provides a mobile device app requesting each file with a pointer to the already present file.

9. The mobile device file management system as in claim 1, wherein said plurality of platforms comprise a social media platform and a texting platform.

10. A method of managing mobile device inter-platform file sharing, said method comprising a mobile device:
  requesting a file on a first platform from a media repository server storing a plurality of files each previously downloaded from one of a plurality of platforms, a media module in the mobile device requesting said file;
  receiving metadata for said file from said media repository server;
  determining from said metadata whether said file is popular; and when said file is popular
  determining whether a copy of said file from any of said plurality of platforms is already in mobile device local storage; and when said copy is already in mobile device local storage
  providing said media module with a pointer to said copy responsive to the file request, wherein copies of popular files already present are not re-downloaded such that mobile device data consumption is reduced.

11. The method of managing mobile device inter-platform file sharing as in claim 10, wherein when said file is not popular or is not already in mobile device local storage, said method further comprises downloading said file from said media repository server responsive to the file request.

12. The method of managing mobile device inter-platform file sharing as in claim 11, wherein said method further comprises said media module displaying the requested file on the requesting mobile device.

13. The method of managing mobile device inter-platform file sharing as in claim 10, wherein said metadata comprises a file identification and a popularity measure for said file, and determining whether said file is popular comprises determining whether said popularity measure exceeds a popularity threshold.

14. The method of managing mobile device inter-platform file sharing as in claim 13, wherein said method further comprises said media repository server: incrementing a count of requests for said file; generating an updated popularity measure responsive to the incremented count; and replacing the popularity measure in metadata for said file with said updated popularity measure.

15. The method of managing mobile device inter-platform file sharing as in claim 14, wherein generating said updated popularity measure comprises averaging accesses to said file in a moving average, said updated popularity measure being said moving average.

16. The method of managing mobile device inter-platform file sharing as in claim 13, wherein said method further comprises said media repository server generating said file identification.

17. The method of managing mobile device inter-platform file sharing as in claim 10, wherein said plurality of platforms comprise a social media platform and a texting platform.

18. A computer program product for managing mobile device inter-platform file sharing, said computer program product comprising a non-transient computer usable medium having computer readable program code stored thereon, said computer readable program code comprising:
  computer readable program code for requesting files for a media module from a media repository server storing a plurality of files each previously downloaded from one of a plurality of platforms;
  computer readable program code for receiving metadata for said requested files from said media repository server;
  computer readable program code for determining from said metadata whether each requested file is popular;
  computer readable program code for determining whether copies of popular files from any of said plurality of platforms already reside in storage local to said media module;
  computer readable program code for downloading said copies from said media repository server; and
  computer readable program code for providing said media module with a downloaded file or a pointer to any said popular file already in local storage responsive to the file request, wherein popular files already present are not re-downloaded such that mobile device data consumption is reduced.

19. The computer program product for managing mobile device inter-platform file sharing as in claim 18, further comprising computer readable program code for said media module displaying the requested file on a requesting mobile device.

20. The computer program product for managing mobile device inter-platform file sharing as in claim 18, wherein when said metadata comprises a file identification and a popularity measure for said file, and determining whether said file is popular comprises determining whether said popularity measure exceeds a popularity threshold.

21. The computer program product for managing mobile device inter-platform file sharing as in claim 18, further comprising computer program product for said media repository server, said computer program product for said media repository server comprising:
  computer readable program code for storing a plurality of files;

computer readable program code for generating said file identification for each of said plurality of files;

computer readable program code for incrementing a count of requests for each of said files;

computer readable program code for generating an updated popularity measure responsive to the incremented count; and computer readable program code for replacing the popularity measure in metadata for said file with said updated popularity measure.

22. The computer program product for managing mobile device inter-platform file sharing as in claim 21, wherein computer readable program code for generating said updated popularity measure comprises computer readable program code for averaging accesses to said file in a moving average, said updated popularity measure being said moving average.

23. The computer program product for managing mobile device inter-platform file sharing as in claim 18, wherein said plurality of platforms comprise a social media platform and a texting platform.

* * * * *